US010432245B2

United States Patent
Byun et al.

(10) Patent No.: US 10,432,245 B2
(45) Date of Patent: Oct. 1, 2019

(54) WIRELESS CHARGING APPARATUS AND METHOD

(71) Applicant: Samsung Electronics Co., Ltd., Gyeonggi-do (KR)

(72) Inventors: Kang-Ho Byun, Gyeonggi-do (KR); Hong-Kweun Kim, Gyeonggi-do (KR); Se-Ho Park, Gyeonggi-do (KR); Kyung-Woo Lee, Gyeonggi-do (KR); Young-Min Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 178 days.

(21) Appl. No.: 14/365,927

(22) PCT Filed: Dec. 14, 2012

(86) PCT No.: PCT/KR2012/010946
§ 371 (c)(1),
(2) Date: Jun. 16, 2014

(87) PCT Pub. No.: WO2013/089504
PCT Pub. Date: Jun. 20, 2013

(65) Prior Publication Data
US 2014/0308996 A1    Oct. 16, 2014

(30) Foreign Application Priority Data
Dec. 15, 2011 (KR) .................. 10-2011-0135028

(51) Int. Cl.
*H04B 1/3883* (2015.01)
*H02J 50/10* (2016.01)
(Continued)

(52) U.S. Cl.
CPC ............ *H04B 1/3883* (2013.01); *H02J 7/025* (2013.01); *H02J 17/00* (2013.01); *H02J 50/10* (2016.02);
(Continued)

(58) Field of Classification Search
CPC ....... G06F 1/26; H04B 1/3883; H04B 5/0037; H04B 5/0075; H02J 50/80; H02J 50/10; H02J 7/025; H02J 17/00; H02J 2007/0096
(Continued)

(56) References Cited

U.S. PATENT DOCUMENTS 8,450,877 B2 * 5/2013 Baarman ............ G06K 19/0707
307/104
8,798,537 B2 * 8/2014 Lee .................... H02J 17/00
455/343.1
(Continued)

FOREIGN PATENT DOCUMENTS

JP      2010233430    10/2010
KR   1020100003354    1/2010
(Continued)

OTHER PUBLICATIONS

PCT/ISA/210 Search Report issued on PCT/KR2012/010946 (pp. 3).
(Continued)

*Primary Examiner* — Mong-Thuy T Tran
(74) *Attorney, Agent, or Firm* — The Farrell Law Firm, P.C.

(57) ABSTRACT

The present invention relates to a method for adjusting a power information transmission period from a mobile terminal to be charged in a wireless charging apparatus. To this end, a wireless charging apparatus according to the present invention comprises: a communication unit for receiving power information from at least one mobile terminal; and a control unit for determining a transmission period of power information for each of the at least one mobile terminal based on the power information and adjusting the transmission period according to whether the power information is received from the at least one mobile terminal. As described (Continued)

above, the waste of resources, which may occur due to unnecessary packet transmission, can be reduced by adaptively adjusting the transmission period, thereby increasing the efficiency of power transmission.

19 Claims, 4 Drawing Sheets

(51) Int. Cl.
  *H02J 50/80*   (2016.01)
  *H02J 17/00*   (2006.01)
  *H02J 7/02*   (2016.01)
  *H04B 5/00*   (2006.01)
  *H02J 7/00*   (2006.01)

(52) U.S. Cl.
  CPC ....... *H02J 50/80* (2016.02); *H02J 2007/0096* (2013.01); *H04B 5/0037* (2013.01); *H04B 5/0075* (2013.01)

(58) Field of Classification Search
  USPC .......................................... 320/108; 455/573
  See application file for complete search history.

(56) References Cited

U.S. PATENT DOCUMENTS

| | | | | |
|---|---|---|---|---|
| 2005/0248313 A1* | 11/2005 | Thorland | ............. | H02J 7/0075 320/130 |
| 2008/0253351 A1 | 10/2008 | Pernu et al. | | |
| 2009/0174264 A1* | 7/2009 | Onishi | ................... | H02J 5/005 307/104 |
| 2009/0212736 A1* | 8/2009 | Baarman | ............... | H02J 7/0004 320/106 |
| 2009/0271048 A1* | 10/2009 | Wakamatsu | ............ | G06F 1/266 700/296 |
| 2010/0007307 A1* | 1/2010 | Baarman | ................. | H02J 7/025 320/108 |
| 2010/0048255 A1* | 2/2010 | Jojivet | ................. | G06K 7/0008 455/573 |
| 2010/0084918 A1* | 4/2010 | Fells | ....................... | H02J 5/005 307/32 |
| 2010/0213895 A1 | 8/2010 | Keating et al. | | |
| 2010/0253281 A1 | 10/2010 | Li et al. | | |
| 2010/0259447 A1 | 10/2010 | Crouch et al. | | |
| 2010/0289457 A1* | 11/2010 | Onnerud | ....................... | H02J 7/0093 320/162 |
| 2011/0221390 A1* | 9/2011 | Won | ....................... | H02J 7/0054 320/108 |
| 2011/0320828 A1* | 12/2011 | Boss | ..................... | G06F 1/3209 713/300 |
| 2012/0104867 A1* | 5/2012 | Mudrick | ................. | H02J 7/025 307/104 |
| 2012/0200158 A1* | 8/2012 | Takei | ....................... | H02J 5/005 307/31 |
| 2012/0329405 A1* | 12/2012 | Lee | ........................ | H02J 17/00 455/73 |
| 2014/0103734 A1* | 4/2014 | Walsh | ................... | H04W 52/10 307/104 |

FOREIGN PATENT DOCUMENTS

| | | |
|---|---|---|
| KR | 1020110034664 | 4/2011 |
| KR | 1020110103297 | 9/2011 |
| KR | 1020110121638 | 11/2011 |
| WO | WO 2010099242 | 9/2010 |

OTHER PUBLICATIONS

PCT/ISA/210 Written Opinion issued on PCT/KR2012/010946 (pp. 4).
Korean Office Action dated Oct. 19, 2017 issued in counterpart application No. 10-2013-0113894, 9 pages.
Korean Office Action dated Aug. 30, 2017 issued in counterpart application No. 10-2011-0135028, 11 pages.

* cited by examiner

WIRELESS CHARGING APPARATUS AND METHOD

PRIORITY

This application is a National Phase Entry of PCT International Application No. PCT/KR2012/010946, which was filed on Dec. 14,2012, and claims priority to Korean Patent Application No. 10-2011-0135028, which was filed on Dec. 15,2011, the contents of which are incorporated herein by reference.

TECHNICAL FIELD

The present invention relates to an apparatus and a method for power charging, and more particularly, to an apparatus and a method for performing wireless power charging.

BACKGROUND ART

Typically, for an operation of a mobile terminal, the mobile terminal needs to be supplied with power. To this end, a battery is mounted on the mobile terminal, and is typically charged by a charger. With respect to such a charging scheme, in order to support the portability of the mobile terminal, research has been performed on a non-contact scheme, a wireless charging scheme, or the like.

In such a wireless charging scheme, when a resonance condition coincides between the mobile terminal to be charged and a charging device which charges the mobile terminal, power delivery efficiency is maximized. Also, in the case of power delivery, it is ideal that the amount of transmission power coincides with that of reception power. However, due to various kinds of external factors occurring along a power delivery path, the amount of reception power is forced to be smaller than that of transmission power.

Accordingly, when a power reception state of the mobile terminal is capable of being identified and a resonance frequency for the generation of transmission power by the charging device is capable of being adaptively adjusted based on the power state information, power delivery efficiency can be maximized. To this end, the mobile terminal transmits power state information on power, that the mobile terminal receives, to the charging device while power is being transmitted between the mobile terminal and the charging device. Then, the charging device determines the amount of power based on the received power state information, and transmits power to the mobile terminal.

DETAILED DESCRIPTION OF THE INVENTION

Technical Problem

When the mobile terminal reaches a stage of stably receiving predetermined power while power is transmitted between the mobile terminal corresponding to a power receiver and the charging device, as described above, the mobile terminal repeatedly transmits identical power state information (i.e., identical power information). On the other hand, the charging device corresponding to a power transmitter supplies the mobile terminal with identical power, according to the power state information.

However, the transmission of a packet carrying the identical power state information or a similar packet may cause a waste of a channel, and moreover, may also reduce the opportunity that another mobile terminal transmits power information. Further, as the mobile terminal repeatedly transmits a packet, unnecessary power consumption occurs, and the possibility of an incorrect operation increases. Accordingly, there is a need for a method capable of increasing the efficiency of power delivery by reducing a waste of resources, which may occur due to the unnecessary transmission of a packet.

Technical Solution

Therefore, an aspect of the present invention is to provide an apparatus and a method for wireless charging, which increase the efficiency of power delivery.

Also, another aspect of the present invention is to provide an apparatus and a method for wireless charging, which optimize a transmission cycle of power information of a mobile terminal to be charged.

In accordance with an aspect of the present invention, an apparatus for wirelessly charging a mobile terminal is provided. The apparatus includes a communication unit that receives power information from at least one mobile terminal capable of being charged; and a control unit that determines a mobile terminal with which communication is to be performed during an allocation period with respect to the at least one mobile terminal, schedules a cycle for receiving power information for the each mobile terminal during the allocation period, and transmits the scheduled information.

Also, in accordance with another aspect of the present invention, a method for wirelessly charging a mobile terminal by an apparatus for wireless charging is provided. The method includes setting a transmission cycle, in which at least one mobile terminal capable of being charged needs to transmit power information to the apparatus for the wireless charging; determining whether the power information is received from the at least one mobile terminal; and adjusting the set transmission cycle according to whether the power information is received from the at least one mobile terminal.

Advantageous Effects

According to embodiments of the present invention, the wireless charging apparatus adaptively adjusts a cycle in which the mobile terminal transmits power information, and thereby a waste of resources which may occur due to the unnecessary transmission of a packet is reduced. Accordingly, the efficiency of delivering power from the wireless charging apparatus to the mobile terminal can be increased.

Also, according to embodiments of the present invention, it is possible to reduce a transmission error due to interference occurring at a frequency used by one or more mobile terminals. Further, the embodiments of the present invention are advantageous in that other nodes using an identical protocol are given the opportunity that the other nodes can use a channel. From the viewpoint of the mobile terminal, it is advantageous that power consumed in communication is reduced.

MODE FOR CARRYING OUT THE INVENTION

Hereinafter, an apparatus and an operation method thereof according to embodiments of the present invention will be described in detail with reference to the accompanying drawings. Various specific definitions found in the following description are provided only to help general understanding of the present invention, and it is apparent to those skilled in the art that the present invention can be implemented without such definitions. Further, a detailed description of known functions and configurations incorporated herein will be omitted when it may make the subject matter of the present invention rather unclear.

Embodiments of the present invention propose a method in which a wireless charging apparatus adjusts a transmission cycle of power information from a mobile terminal to be charged. To this end, the wireless charging apparatus according to an embodiment of the present invention includes a communication unit that receives power information from at least one mobile terminal, and a control unit that determines a transmission cycle of power information for each mobile terminal based on the power information, and adjusts the transmission cycle according to whether the power information is received from the at least one mobile terminal. The transmission cycle is adaptively adjusted as described above, and thereby a waste of resources is reduced which may occur due to the unnecessary transmission of a packet. Accordingly, the efficiency of power delivery can be increased.

A configuration and an operation of a multi-power transmission system which operates as described above will be described with reference to FIG. 1. The multi-power transmission system according to embodiments of the present invention includes one wireless charging apparatus serving as a power transmitter and one or more mobile terminals serving as a power receiver. In the multi-power transmission system, examples of the mobile terminal 175 may include a mobile phone, a Personal Digital Assistant (PDA), a Moving Picture Experts Group (MPEG) Audio Layer-3 (MP3), a laptop computer, and the like.

Figure 1:
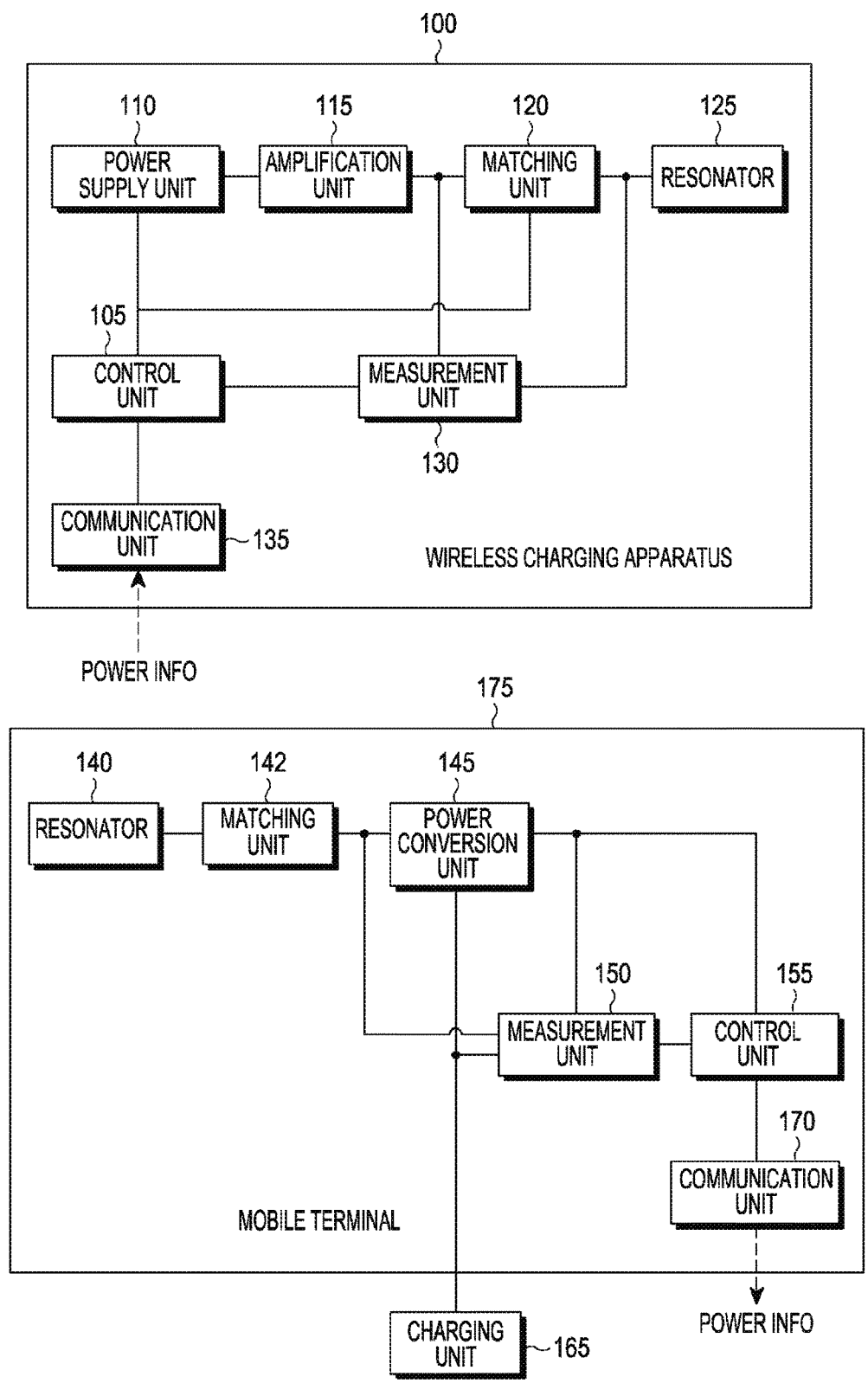
FIG. 1 is a view illustrating an internal block configuration of a wireless charging apparatus and that of a mobile terminal according to an embodiment of the present invention.

Referring to FIG. 1, the wireless charging apparatus 100 includes a control unit 105, a power supply unit 110, an amplification unit 115, a matching unit 120, a resonator 125, a measurement unit 130, and a communication unit 135.

First, the control unit 105 measures the value of power, which is output to the resonator 125, through the measurement unit 130. When a target to be charged does not exist around the wireless charging apparatus 100, if the control unit 105 applies constant power to the amplification unit 115 through the power supply unit 110, a current flowing through the resonator 125 is also measured to be constant. In contrast, when the target to be charged exists around the wireless charging apparatus 100, although the control unit 105 applies constant power to the amplification unit 115, a measured current value is changed. Because the control unit 105 of the wireless charging apparatus 100 previously knows a basic measurement value matched to a particular state as described above, the control unit 105 may detect a state change through a difference between a measured current value and a basic measurement value.

Also, the control unit 105 may predict power transmission situation through a difference between a previously-measured current value and the currently-measured current value. When the control unit 105 again measures a current while a current value measured in a stable state is previously stored, if the control unit 105 determines that the measured current value is different enough to be valid from the previously-measured current value (i.e., if a current change is sensed), the control unit 105 recognizes the occurrence of one of situations which follow.

The situations include a case in which a new mobile terminal is located, a case in which a foreign substance is located, a case in which, in a state where one or more mobile terminals have previously been located, any one of the one or more mobile terminals starts the reception of power, stops the reception of power, or moves the location thereof in a power transmission range and thereby is subjected to a change in the amount of received power, a case of a change in the amount of power received by any one of the one or more mobile terminals, a case in which any one of the one or more mobile terminals is predicted to be beyond the power transmission range, and the like.

When the above-described situations occur, the control unit 105 may adjust the value of power of the power supply unit 110, may control the switching of R, L and C which are elements of the matching unit 120, or may adjust a resonant frequency. As a result, the control unit 105 may increase the efficiency of delivering power to the mobile terminal. Alternatively, the control unit 105 controls a matching unit 142 within the mobile terminal 175 by transmitting a control message to the mobile terminal 175, and thereby optimizes the transmission of power between the wireless charging apparatus 100 and the mobile terminal 175. An adjustment process for optimizing the transmission of power is performed between the wireless charging apparatus 100 and the mobile terminal 175 as described above. When the adjustment for delivering optimal power is completed, the control unit 105 reaches a stage in which power is stably transmitted between the wireless charging apparatus 100 and the mobile terminal 175.

Specifically, the control unit 105 controls an overall operation of the wireless charging apparatus 100, and generates a control signal, which periodically requests power information from the mobile terminal 175 in a power supply area, and delivers the generated control signal to the mobile terminal 175 through the communication unit 135. Also, when receiving the power information from the mobile terminal 175 through the communication unit 135, the control unit 105 generates a power transmission control value for generating power matched to the power information, and provides the generated power transmission control value to the related elements of the wireless charging apparatus 100.

Accordingly, the power supply unit 110 generates a power source based on the power transmission control value provided by the control unit 105, and the resonator 125 transmits power at a resonant frequency, which is adjusted according to the generated power source.

The communication unit 135 serves to perform communication with one or more mobile terminals to be charged. To this end, one of various wireless short-range communication schemes may be selected, and the selected wireless short-range communication scheme may be applied to the communication unit 135. The communication unit 135 receives power information from the mobile terminal 175. The power information is information provided by the mobile terminal 175 when the mobile terminal 175 approaches a power supply area. The power information may further include matching circuit information of the mobile terminal 175, reception frequency information thereof, and the like, in addition to multiple pieces of power information measured by the mobile terminal 175, such as information on a voltage and a current induced in an antenna of the mobile terminal 175, information on a voltage and a current obtained by rectifying power induced in a coil, information on a voltage and a current supplied to a charging unit 165, and the like.

The control unit 105 determines a transmission cycle of power information for each mobile terminal, and adjusts the transmission cycle according to whether the power information is received from the at least one mobile terminal. Such an operation of the control unit 105 will be described in detail below.

Elements other than the above-described elements correspond to typical elements of the wireless charging apparatus, and operations of the typical elements thereof will be briefly described as follows. Also, FIG. 1 schematically illustrates only the elements related to an embodiment of the present invention, and it goes without saying that a configuration of the wireless charging apparatus is not limited thereto.

The measurement unit 130 serves to deliver a result of measuring a current delivered to the resonator 125, to the control unit 105, and a power transmission control value for adjusting a resonant frequency may be determined based on the result of the measurement.

The matching unit 120 serves to match an impedance of the wireless charging apparatus 100 to the resonator 125.

On the other hand, the mobile terminal 175 includes a resonator 140, a matching unit 142, a power conversion unit 145, a measurement unit 150, a control unit 155, a charging unit 165, and a communication unit 170. The mobile terminal 175 illustrated in FIG. 1 is based on the premise that the mobile terminal 175 does not have a separate battery and operates by using only power received through the resonator 140.

The mobile terminal 175 transmits power information thereof in every transmission cycle according to the related art. However, according to an embodiment of the present invention, the mobile terminal 175 transmits power information in response to a transmission cycle adjusted by the wireless charging apparatus 100. The mobile terminal 175 transmits power information thereof through the communication unit 170. The power information may be generated based on a result of measuring a change in the power conversion unit 145 and/or the charging unit 165 by the measurement unit 150. Elements of the mobile terminal 175 other than the above-described elements have little to do with the present invention. Accordingly, a detailed description thereof will be omitted.

Figure 2:
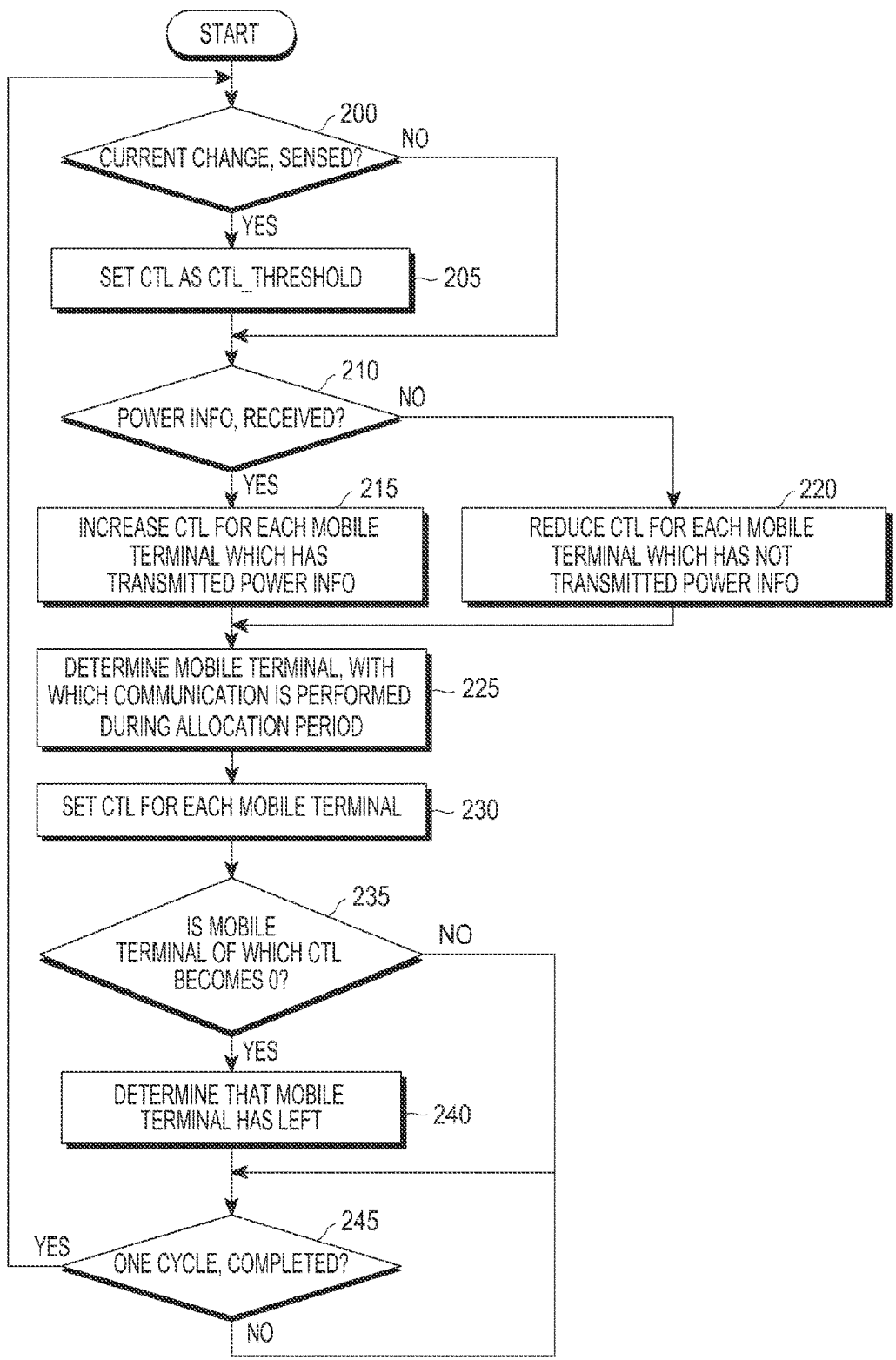
FIG. 2 is a flowchart illustrating an operation of a wireless charging apparatus for adjusting a transmission cycle of power information according to an embodiment of the present invention.

Meanwhile, an operation of the wireless charging apparatus including the above-described elements will be described with reference to FIG. 2. In FIG. 2, it is premised that one or more mobile terminals are located in a power supply area of the wireless charging apparatus 100.

Referring to FIG. 2, in step 200, the wireless charging apparatus 100 determines whether a current change is sensed. When the current change is sensed, the wireless charging apparatus 100 recognizes the occurrence of one of the above-described situations. For example, a current change occurs according to the above-described situation in which a new mobile terminal is located, leaves, or the like.

When the current change occurs, the current change is generated by a new mobile terminal or by any one of one or more previously-located mobile terminals in a state where the one or more previously-located mobile terminals exist. Accordingly, the wireless charging apparatus 100 needs to receive power information from the new mobile terminal or any one of the one or more previously-located mobile terminals. In this regard, in step 205, the wireless charging apparatus 100 sets a transmission cycle of power information as a threshold cycle. Specifically, the wireless charging apparatus 100 needs to receive the power information as quickly as possible, and thus sets the transmission cycle of the power information to the threshold cycle which is a basic transmission cycle. At this time, a transmission cycle of power information of each of all the mobile terminals located in the power supply area is changed to the threshold cycle. A mobile terminal, of which a transmission cycle of power information is shorter than the threshold cycle, is previously excluded through the adjustment of a transmission cycle of power information. When a mobile terminal has a transmission cycle of power information which is shorter than the threshold cycle, if the transmission cycle of the power information of the mobile terminal is changed to the threshold cycle, the transmission cycle of the power information thereof is increased. Accordingly, it is desirable to exclude the mobile terminal having the transmission cycle of the power information which is shorter than the threshold cycle.

Also, there may be a case in which power information needs to be received as quickly as possible besides a case in which the current change is sensed in step 200. Specifically, there may be a case in which it is determined that it is necessary to receive power information. For example, step 205 may also be performed, when the mobile terminal delivers a message notifying of an abnormal state instead of a current change sensing operation in step 200, or when it is determined that power transmission efficiency is not optimal, namely, when it is determined that power transmission efficiency does not reach predetermined power transmission efficiency.

In contrast, when the current change does not occur, for example, although the mobile terminal does not receive power, from the viewpoint of the mobile terminal, the mobile terminal needs communication in order to report that the mobile terminal is in a standby state and to notify of required power information. Accordingly, in this case, the mobile terminal does not need to frequently notify of power information thereof. However, in a state where the mobile terminal is receiving power from the wireless charging apparatus 100, the mobile terminal needs to change the number of times of transmitting power information, according to a power transmission state of the wireless charging apparatus 100.

Here, a transmission cycle of power information signifies a variable for determining whether power information is received, and is referred to as a "Cycle To Live (CTL)" in an embodiment of the present invention. Also, a threshold cycle signifies a reference value, in which the feedback of power information needs to be received from the mobile terminal, and is referred to as a "CTL_Threshold." Specifically, if a CTL is shorter than or equal to a CTL_Threshold, it signifies that it is required to communicate with a mobile terminal having the CTL which is shorter than or equal to the CTL_Threshold. In contrast, if a mobile terminal has a CTL exceeding the CTL_Threshold, it signifies that it is not required to communicate with the mobile terminal.

As described above, the wireless charging apparatus 100 does not receive power information from each of all the mobile terminals at every time, but adaptively adjusts a CTL according to a state of a mobile terminal. In this regard, a case in which a mobile terminal requires the transmission of power information implies that the wireless charging apparatus 100 adjusts a CTL as a CTL-Threshold so as to enable mobile terminal to transmit feedback as quickly as possible. A case in which a mobile terminal does not require the transmission of power information implies that the wireless charging apparatus 100 may minimize communication. Accordingly, the wireless charging apparatus 100 adjusts a CTL in such a manner as to increase the CTL in order not to unnecessarily transmit power information.

Figure 3:
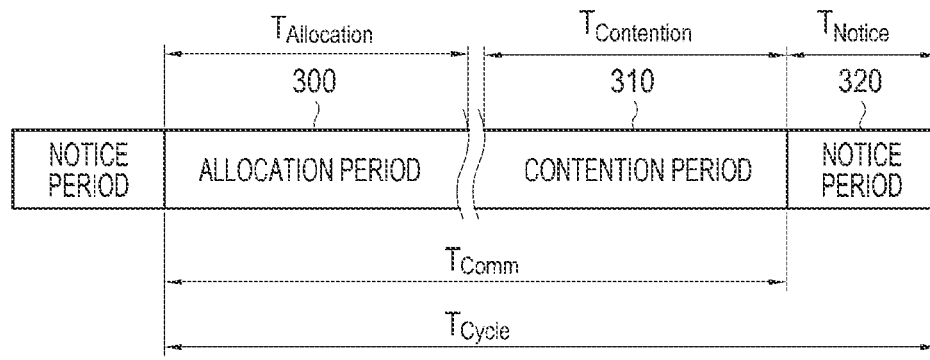
FIG. 3 is a view illustrating a structure of a superframe used in a wireless charging apparatus according to an embodiment of the present invention.

At this time, the wireless charging apparatus 100 communicates with each mobile terminal by using a structure of a superframe as illustrated in FIG. 3.

Referring to FIG. 3, the superframe is defined as one cycle including an allocation period 300, a contention period 310, and one notice period 320. The wireless charging apparatus 100 periodically transmits a notice frame, and a period between notice frames is divided into the allocation period 300 for receiving power information from at least one mobile terminal, and the contention period 310 for other communications. In FIG. 3, $T_{Notice}$ signifies a time period for transmitting a notice frame, and is variable within a range $T_{Notice\_MAX}$. The notice frame may be transmitted after waiting until a channel becomes clear when the channel is busy. Accordingly, $T_{Notice}$ is variable.

Also, $T_{Allocation}$ is a time period for receiving power information from at least one mobile terminal, $T_{Contention}$ is a time period for communication other than the reception of power information, and $T_{Comm}$ is equal to the sum of $T_{Allocation}$ and $T_{Contention}$. $T_{Allocation}$ and $T_{Contention}$ are dynamically variable, but $T_{Comm}$ a fixed value. On the other hand, $T_{Cycle}$ is equal to the sum of $T_{Notice}$ and $T_{Comm}$, and is variable within a range obtained by sum of $T_{Notice}$ and $T_{Comm}$. Because $T_{Notice}$ is variable, $T_{Cycle}$ which is a value obtained by the sum of $T_{Notice}$ and $T_{Comm}$ is also variable.

Figure 4:
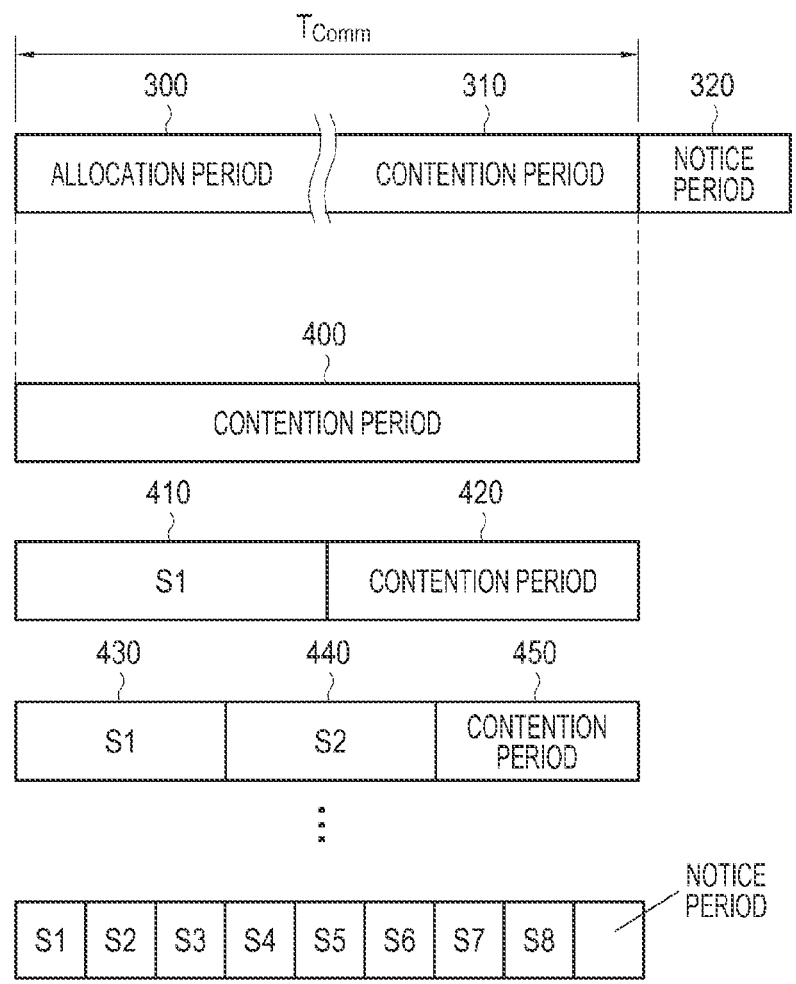
FIG. 4 is a view illustrating an application example of FIG. 3.

The allocation period 300 and the contention period 310 may be dynamically determined by the wireless charging apparatus 100, as illustrated in FIG. 4. Referring to FIG. 4, when a mobile terminal does not exist around the wireless charging apparatus 100, the wireless charging apparatus 100 sets a period, which includes the allocation period 300 and the contention period 310, as only a contention period 400. When the wireless charging apparatus 100 intends to receive power information from one mobile terminal, the wireless charging apparatus 100 sets an s1 allocation period 410 and a contention period 420. Similarly, when the wireless charging apparatus 100 intends to receive power information from each of two mobile terminals, the wireless charging apparatus 100 divides $T_{Comm}$, which is the sum of the allocation period 300 and the contention period 310, into three parts, and sets the three parts as an s1 allocation period 430, an s2 allocation period 440, and a contention period 450.

When determining that it is necessary to receive power information according to the sensing of the current change and the like as described above, the wireless charging apparatus 100 receives power information from each of all the mobile terminals located in a power supply area according to a request scheme which follows. One example of the request scheme is a scheme, in which the wireless charging apparatus 100 directly transmits a control message for requesting power information through the communication unit 135. In response to the transmitted control message, a mobile terminal which receives the control message transmits power information thereof to the wireless charging apparatus 100 through the communication unit 170.

Accordingly, in step 210, the wireless charging apparatus 100 determines whether power information has been received. At this time, whether power information has been received is applied to all the mobile terminals that the wireless charging apparatus 100 manages. However, the power information is actually transmitted by all the mobile terminals located in the power supply area, or by at least one of all the mobile terminals. When receiving the power information, in step 215, the wireless charging apparatus 100 increases a CTL for each mobile terminal which has transmitted the power information. In contrast, when the power information is not received in step 210, in step 220, the wireless charging apparatus 100 reduces a CTL for each mobile terminal which has not transmitted the power information. A method for increasing and reducing a CTL as described above will be described in detail below.

In step 225, the wireless charging apparatus 100 determines a mobile terminal, with which the wireless charging apparatus 100 is to communicate during an allocation period. In step 230, the wireless charging apparatus 100 sets a CTL for each mobile terminal. For example, when multiple mobile terminals are located in the power supply area, the wireless charging apparatus 100 needs to continuously communicate with a mobile terminal which is still being charged among the multiple mobile terminals, and needs to continuously receive power information from the mobile terminal. When the wireless charging apparatus 100 has completed the charging of a mobile terminal but needs to maintain communication with the mobile terminal, the wireless charging apparatus 100 does not need to periodically receive power information from the mobile terminal. Accordingly, in view of this case, the wireless charging apparatus 100 sets a CTL for each mobile terminal.

Accordingly, when the wireless charging apparatus 100 performs scheduling by setting a CTL for each mobile terminal as in step 230, the wireless charging apparatus 100 uses a notice frame to provide the set information to the mobile terminals. The notice frame carries the set information, and is transmitted in order to share a schedule, in which communication is to be performed during an allocation period. Specifically, the notice frame corresponds to set information, and includes an address of each mobile terminal, which needs to transmit power information in a next cycle, and time information of the allocation period.

In step 235, the wireless charging apparatus 100 determines whether there is a mobile terminal of which a CTL becomes 0. When there is a mobile terminal of which a CTL becomes 0, in step 240, the wireless charging apparatus 100 determines that the relevant mobile terminal has left the power supply area. Accordingly, the wireless charging apparatus 100 deletes information on the mobile terminal which has left the power supply area. For example, the information on the mobile terminal is deleted from a list of mobile terminals, with which the wireless charging apparatus 100 is to communicate during the allocation period. Step 235 and step 240 illustrated in FIG. 2 may be performed before step 225. In step 245, the wireless charging apparatus 100 determines whether one cycle (i.e., the allocation period 300, the contention period 310 and the notice period 320 as illustrated in FIG. 3) is completed. At this time, the wireless charging apparatus 100 transmits a notice frame, and thereby a next cycle begins simultaneously with completing one cycle. Accordingly, when one cycle has been completed, the wireless charging apparatus 100 returns to step 200 in order to repeatedly perform the above-described process in the next cycle.

Figure 5:
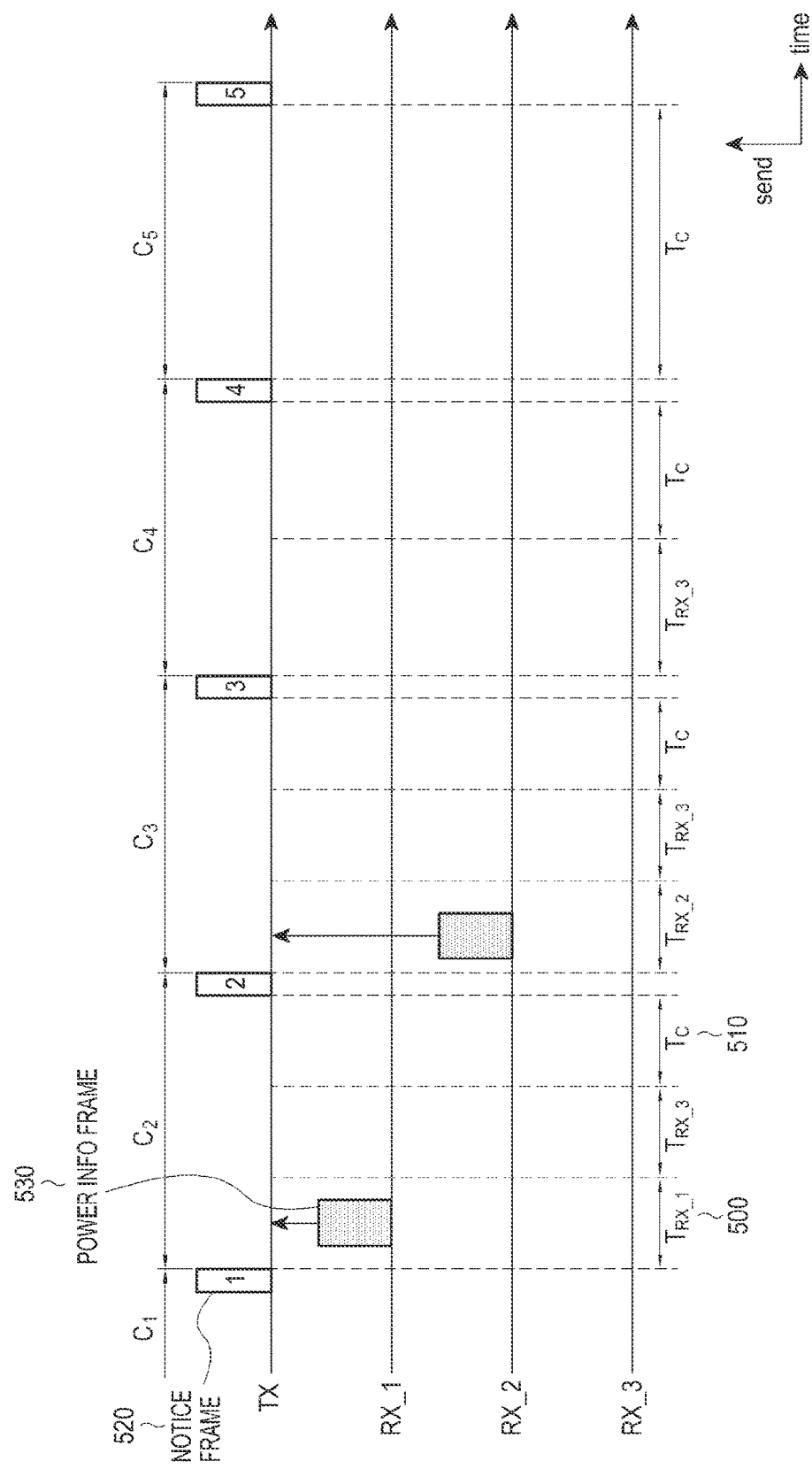
FIG. 5 is a view for explaining an example of a method for adjusting a transmission cycle of power information according to an embodiment of the present invention.

Meanwhile, a case has been described in which a CTL of each mobile terminal is increased or reduced according to whether power information has been received in the current cycle. Based on the description of the case, how a CTL is adjusted in the next cycle will be described in more detail with reference to Table 1 below and FIG. 5. FIG. 5 is a view for explaining an example of a method for adjusting a CTL, and illustrates an algorithm for managing the CTL and an example of multi-power transmission which operates by using a superframe.

When determining that the wireless charging apparatus 100 needs communications with RX_1 and RX_3 in a cycle $C_2$ as described above, the wireless charging apparatus 100 sets $T_{RX\_1}$ and $T_{RX\_3}$ as respective allocation periods for RX_1 and RX_3, and sets $T_C$ as a remaining contention period. In other words, $T_{RX\_1}$ signifies a time period allocated for communicating with RX_1, and $T_C$ signifies a time period which is set as a contention period.

FIG. 5 illustrates an example where in the cycle $C_2$, the wireless charging apparatus 100 receives a power information frame from RX_1 and does not receive a power information frame from RX_3. In this case, for RX_1, as shown in Table 1, a CTL level is increased by 1 to be changed from

TABLE 1

| Time | ID | Whether power info is received | CTL level | CTL | 0 < CTL ≤ CTL_Threshold | The number of mobile terminals from which power info needs to be received |
|---|---|---|---|---|---|---|
| 1 | RX_1 | not received | 1 | 3 | TRUE | 2 |
|   | RX_2 | not received | 2 | 4 | FALSE |   |
|   | RX_3 | not received | 1 | 3 | TRUE |   |
| 2 | RX_1 | received | 2 | 7 | FALSE | 2 |
|   | RX_2 | not received | 2 | 3 | TRUE |   |
|   | RX_3 | not received | 1 | 2 | TRUE |   |
| 3 | RX_1 | not received | 2 | 6 | FALSE | 1 |
|   | RX_2 | received | 3 | 15 | FALSE |   |
|   | RX_3 | not received | 1 | 1 | TRUE |   |
| 4 | RX_1 | not received | 2 | 5 | FALSE | 0 |
|   | RX_2 | not received | 3 | 14 | FALSE |   |
|   | RX_3 | not received | 1 | 0 | FALSE |   |
| 5 | RX_1 | not received | 2 | 4 | FALSE | 0 |
|   | RX_2 | not received | 3 | 13 | FALSE |   |

Table 1 shows a variable table that the wireless charging apparatus 100 stores in every cycle.

Time shown in Table 1 is mapped to a number written within a notice frame 520 in FIG. 5. More specifically, a value (i.e., a number) of an item named "Time" is mapped to a value denoted within the notice frame 520 in FIG. 5.

In Table 1, items named "ID," "Whether power info is received," "CTL level," and "CTL" are values that the wireless charging apparatus 100 maintains in a memory thereof at a time point Time.

In FIG. 5, when the wireless charging apparatus 100 is denoted as TX and multiple mobile terminals to be charged are denoted as RX_1, RX_2 and RX_3, each of $C_1$, $C_2$, $C_3$, $C_4$ and $C_5$ represents one cycle. In this case, a mobile terminal, with which the wireless charging apparatus 100 is to communicate during an allocation period, is determined by a method which follows. Specifically, the wireless charging apparatus 100 determines that it is necessary to communicate with each mobile terminal, of which a CTL exceeds 0 and is shorter than or equal to a CTL_Threshold. For example, when Time is equal to 1 in Table 1, a CTL of a mobile terminal having an ID of RX_1 has a value of 3, and thus the wireless charging apparatus 100 determines that the wireless charging apparatus 100 needs to receive power information from RX_1. Similarly, a CTL of a mobile terminal having an ID of RX_3 has a value of 3, and thus the wireless charging apparatus 100 determines that the wireless charging apparatus 100 needs to receive power information from RX_1. Also, because a CTL of a mobile terminal having an ID of RX_2 has a value of 4 which is greater than the CTL_Threshold, the wireless charging apparatus 100 determines that the wireless charging apparatus 100 does not need to receive power information from RX_2.

1 to 2, and the CTL is increased from 3 to 7, in a cycle $C_2$ as compared with the previous cycle $C_1$. At this time, the CTL is calculated by Equation (1) below.

$$CTL = 2^{CTL-Level+1} - 1 \qquad (1)$$

Also, for RX_3, as shown in Table 1, a CTL level is maintained as 1, whereas a CTL is reduced by 1 and is changed from 3 to 2 as compared with the previous cycle $C_1$. In contrast, because RX_2 is not allocated a time period and does not transmit power information in the cycle $C_2$, a CTL level is maintained as 2, but a CTL is changed from 4 to 3.

Referring to FIG. 5, RX_3 does not transmit a power information frame to TX during $C_2$, $C_3$ and $C_4$. Accordingly, for RX_3, as shown in Table 1, a CTL having a value of 3 at a time point when Time is equal to 1 has a value of 0 at a time point when Time is equal to 4. The wireless charging apparatus 100 determines that a mobile terminal having a value of a CTL which becomes 0 has left the power supply area, and deletes a variable table of RX_3.

According to embodiments of the present invention, the wireless charging apparatus adaptively adjusts a cycle in which the mobile terminal transmits power information, and thereby a waste of resources which may occur due to the unnecessary transmission of a packet is reduced. Accordingly, the efficiency of delivering power from the wireless charging apparatus to the mobile terminal can be increased.

Also, according to embodiments of the present invention, it is possible to reduce a transmission error due to interference occurring at a frequency used by one or more mobile terminals. Further, the embodiments of the present invention are advantageous in that other nodes using an identical protocol are given the opportunity that the other nodes can use a channel. From the viewpoint of the mobile terminal, it is advantageous in that power consumed in communication is reduced.

The invention claimed is:

1. An apparatus for wirelessly charging at least one device, the apparatus comprising:
   a resonator that wirelessly transmits power for charging the at least one device;
   a communication unit; and
   a control unit configured to:
      receive, through the communication unit, power state information from the at least one device,
      compare between a transmission cycle of each of the at least one device and a threshold cycle based on the power state information,
      determine, among the at least one device, a device with which the apparatus is to communicate during an allocation period based on the comparison between the transmission cycle of each of the at least one device and the threshold cycle,
      set a transmission cycle of the determined device based on the received power state information, and
      transmit, through the communication unit, a message to the determined device including the set transmission cycle.

2. The apparatus as claimed in claim 1, wherein the message is provided by using a notice frame.

3. The apparatus as claimed in claim 1, wherein the control unit reduces the transmission cycle of a device that has not transmitted the power state information.

4. The apparatus as claimed in claim 3, wherein the control unit deletes the device that has not transmitted the power state information from a communication target list according to the reduction of the transmission cycle.

5. The apparatus as claimed in claim 1, wherein the control unit changes the transmission cycle of each of the at least one device to a basic cycle in which the power state information is capable of being periodically received from the at least one device, when a current change is sensed.

6. The apparatus as claimed in claim 1, wherein the control unit changes the transmission cycle of the at least one device to a basic cycle in which the power state information is capable of being periodically received from the at least one device, when the control unit receives a message notifying of an abnormal state from the at least one device.

7. The apparatus as claimed in claim 1, wherein the control unit changes the transmission cycle of the at least one device to a basic cycle in which the power state information is capable of being periodically received from the at least one device, when a power transmission efficiency does not reach a predetermined power transmission efficiency.

8. The apparatus as claimed in claim 1, wherein the control unit changes, to a basic cycle, the transmission cycle of a device, of which the transmission cycle is longer than or equal to the basic cycle with respect to the at least one device.

9. The apparatus as claimed in claim 1, wherein the control unit determines transmission of power to the at least one device based on the power state information received through the communication unit.

10. The apparatus as claimed in claim 1, wherein the power state information comprises at least one of:
   information on a voltage and a current induced in an antenna of the at least one device;
   information on a voltage and a current obtained by rectifying power induced in a coil; and
   information on a voltage and a current supplied to a charging unit.

11. The apparatus as claimed in claim 1, wherein the control unit determines a device which has a transmission cycle being equal to or less than a corresponding threshold value as the determined device.

12. The apparatus as claimed in claim 1, wherein the control unit updates each of the transmission cycle by setting a transmission cycle corresponding to a device that transmits the power state information during the allocation period as a predetermined transmission cycle.

13. A method for wirelessly charging at least one device by a wireless charging transmitter, the method comprising:
   receiving power state information from the at least one device;
   comparing between a transmission cycle of each of the at least one device and a threshold cycle based on the power state information;
   determining, among the at least one device, a device with which the apparatus is to communicate during an allocation period based on the comparison between the transmission cycle of each of the at least one device and the threshold cycle;
   setting a transmission cycle of the determined device based on the received power state information; and
   transmitting a message to the determined device including the set transmission cycle.

14. The method as claimed in claim 13, wherein the setting the transmission cycle of the determined device based on the received power state information comprises increasing a transmission cycle of a device that has transmitted the power state information, and reducing a transmission cycle of a device that has not transmitted the power state information.

15. The method as claimed in claim 14, further comprising:
   deleting the device that has not transmitted the power state information from a communication target list according to the reduction of the transmission cycle.

16. The method as claimed in claim 13, further comprising determining transmission of power to the at least one device based on the received power state information.

17. The method as claimed in claim 13, wherein the power state information comprises at least one of:
   information on a voltage and a current induced in an antenna of the at least one device;
   information on a voltage and a current obtained by rectifying power induced in a coil; and
   information on a voltage and a current supplied to a charging unit.

18. The method as claimed in claim 13, wherein the determining, among the at least one device, the device comprises determining a device which has a transmission cycle being equal to or less than a corresponding threshold value as the determined device.

19. The method as claimed in claim 13, further comprising setting a value corresponding to a device that transmits the power state information during the allocation period as a predetermined transmission cycle.

* * * * *

UNITED STATES PATENT AND TRADEMARK OFFICE
CERTIFICATE OF CORRECTION

PATENT NO. : 10,432,245 B2
APPLICATION NO. : 14/365927
DATED : October 1, 2019
INVENTOR(S) : Kang-Ho Byun et al.

Page 1 of 1

It is certified that error appears in the above-identified patent and that said Letters Patent is hereby corrected as shown below:

In the Claims

In Column 11, Line 13, "compare between a transmission cycle of each of the at" should be -- compare a transmission cycle of each of the at --.

In Column 11, Line 18, "allocation period based on the comparison between" should be -- allocation period based on the comparison of --.

In Column 12, Line 20, "comparing between a transmission cycle of each of the at" should be -- comparing a transmission cycle of each of the at --.

In Column 12, Line 25, "allocation period based on the comparison between the" should be -- allocation period based on the comparison of the --.

Signed and Sealed this
Twelfth Day of November, 2019

Andrei Iancu
*Director of the United States Patent and Trademark Office*